UNITED STATES PATENT OFFICE.

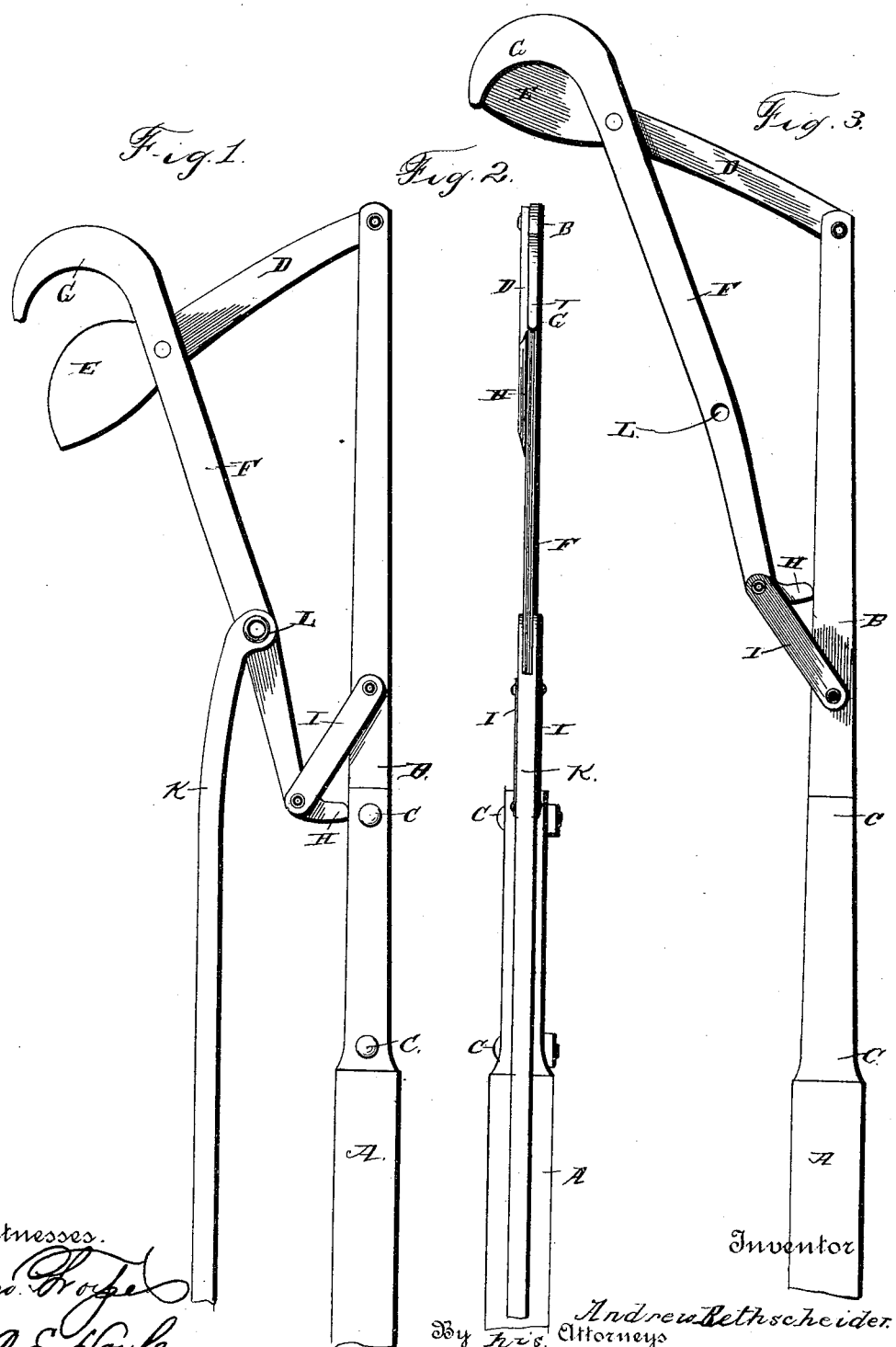

ANDREW BETHSCHEIDER, OF HEBRON, NEBRASKA.

PRUNING IMPLEMENT.

SPECIFICATION forming part of Letters Patent No. 388,111, dated August 21, 1888.

Application filed January 11, 1888. Serial No. 260,431. (No model.)

*To all whom it may concern:*

Be it known that I, ANDREW BETHSCHEIDER, a citizen of the United States, residing at Hebron, in the county of Thayer and State of Nebraska, have invented a new and useful Improvement in Pruning Implements, of which the following is a specification.

My invention relates to improvements in pruning implements; and it has for its object to provide a tool which is simple, cheap of manufacture, light, and easily operated, and in which the movement of the blades is limited by simple means.

My improved implement consists, mainly, in a shank, a swinging arm pivoted to the upper end of the shank and bearing a knife or cutter on its free end, a hook-arm pivoted at one end to the outer end of the swinging arm and having a hook to oppose the cutter or knife on the said arm, the other end of the hook-arm being connected to the shank by means of links, and a stop on the lower end of the said hook-arm to pass between the said links and impinge against the side of the shank at both the upper and lower ends of the stroke to limit the movements of the arms above mentioned.

The details of construction of this invention are more fully described hereinafter in connection with the accompanying drawings, wherein—

Figure 1 is a side view showing the cutting-jaws open and provided with the operating rod or handle. Fig. 2 is an edge view of the same. Fig. 3 is a side view showing the jaws closed, but with the handle omitted.

Referring by letter to the drawings, A designates the shaft or handle of the implement, to the upper end of which is secured the shank B by means of bolts C C.

D designates a swinging arm, which is pivoted at one end to the upper end of the shank, and is provided at the other end with a knife or cutter, E. The hook-arm F is provided at its upper end with a hook, G, and it is pivoted at a point adjacent to the said hook to the swinging arm D. The lower end of the hook-arm is provided with a finger or stop, H, for a purpose to be hereinafter explained. The lower end of the arm F is connected to the shank B by means of the side links, I I, which are pivoted at their ends, respectively, to the shank and arm F. The finger or stop H, as will be seen, is formed integral with the hooked arm and projects toward the shank. Therefore, when the hooked arm is operated, thereby causing the knife-arm and the connecting-links to swing, the upward and downward movements of the arms are limited by the stop or finger H striking against the edge of the shank.

The operation of my invention, which will be readily seen from the foregoing description, is as follows: Engage the hook over the limb to be trimmed and draw downward upon the handle, thereby causing the hooked arm to swing up and close the knife or cutter against the hook. When very small limber twigs are to be trimmed, it is necessary to give the handle a quick jerk downward to cause the cutting-jaws to close.

It may be preferred under certain circumstances to have a light operating rod or handle, and in Figs. 1 and 2 I show a handle, K, attached at its upper end to the hook-arm, and a small perforation, L, formed in the said arm for the reception of a pivot to secure it in place. I prefer, however, to use the implement without the operation-handle, as it is lighter.

I am aware that pruning implements have heretofore been used which were constructed on the same general principle as the herein-described device, and I do not desire to claim this construction; and I am further aware that implements of this character have heretofore been made which were provided with means to limit the movements of the cutting-arms, and it will be understood that I therefore claim only the specific arrangement of the parts, which is such as to render the operation easy and prevent the cutting-edges of the arms from coming forcibly in contact with each other. In this the cutting edge or edges are maintained in their sharpened condition for a long time. Further, the means which I provide for limiting the movement of the arms forms a part of one of the arms, and consists, essentially, of a stop on the end thereof, and consequently the proper operation of the device does not depend upon the shank of any particular construction. This device may be applied to any handle or shank, and it will operate satisfactorily.

Having thus described my invention, I claim—

In a pruning implement, the combination, with the shank B, having a suitable handle at its lower end, the knife-arm D, pivoted to the upper end of said shank, and the convex knife E on the outer end of said arm, of the arm F, having the edgeless hook G on its upper end and pivoted below said hook to the arm D, just to the inner side of the knife E, the pivoted links I, connecting suitable points of the shank and arm F, and the inwardly-standing stop forming the lower end of said arm and acting as both an upper and lower stop for the hook and knife, substantially as specified.

In testimony that I claim the foregoing as my own I have hereto affixed my signature in presence of two witnesses.

ANDREW BETHSCHEIDER.

Witnesses:
CHAS. P. SCHWER,
JOSEPH KLAES.